United States Patent
Inaba et al.

(10) Patent No.: US 8,653,401 B2
(45) Date of Patent: Feb. 18, 2014

(54) WIRE ELECTRIC DISCHARGE MACHINING APPARATUS HAVING FUNCTION OF AUTOMATICALLY SELECTING AUTOMATIC WIRE CONNECTING PARAMETER

(71) Applicant: FANUC Corporation, Yamanashi (JP)

(72) Inventors: Harutora Inaba, Yamanashi (JP); Mizuho Yamasaki, Yamanashi (JP)

(73) Assignee: Fanuc Corporation, Yamanashi (JP)

(*) Notice: Subject to any disclaimer, the term of this patent is extended or adjusted under 35 U.S.C. 154(b) by 0 days.

(21) Appl. No.: 13/658,120

(22) Filed: Oct. 23, 2012

(65) Prior Publication Data

US 2013/0161292 A1    Jun. 27, 2013

(30) Foreign Application Priority Data

Dec. 22, 2011 (JP) ................... 2011-282058

(51) Int. Cl.
*B23H 7/10* (2006.01)
*B23H 7/20* (2006.01)

(52) U.S. Cl.
USPC ........................................ 219/69.12

(58) Field of Classification Search
USPC .................. 219/69.12, 69.13, 69.17; 700/162
See application file for complete search history.

(56) References Cited

U.S. PATENT DOCUMENTS

| | | | | |
|---|---|---|---|---|
| 4,598,189 A | * | 7/1986 | Inoue et al. | 219/69.12 |
| 4,778,972 A | * | 10/1988 | Josserand | 219/69.12 |
| 5,055,649 A | * | 10/1991 | Iwasaki et al. | 219/69.12 |

FOREIGN PATENT DOCUMENTS

| | | | |
|---|---|---|---|
| EP | 0652067 A1 | | 5/1995 |
| EP | 0664177 A1 | | 7/1995 |
| JP | 1-125424 A | * | 5/1989 |
| JP | 5200628 A | | 8/1993 |
| JP | 6304819 A | | 11/1994 |
| JP | 7024643 A | | 1/1995 |
| JP | 7112328 A | | 5/1995 |
| JP | 7116926 A | | 5/1995 |
| JP | 2002239840 A | | 8/2002 |
| JP | 2010162631 A | | 7/2010 |

* cited by examiner

Primary Examiner — Geoffrey S Evans
(74) Attorney, Agent, or Firm — Lowe Hauptman & Ham, LLP

(57) ABSTRACT

By utilizing a function of automatically selecting an automatic wire-connection parameter of a wire electric discharge machining apparatus, a default cutting condition is read, a cutting process is executed, and a wire-connection process is executed. As a result, when the wire connection is successful, the process in an automatic wire connection mode is ended. On the other hand, when the wire connection is unsuccessful, it is determined whether or not a parameter set selected by executing a cutting condition automatic selection process is adopted as a new default cutting condition. When the selected parameter set is adopted as the new default cutting condition, the selected parameter set is stored as the new default cutting condition, and the automatic wire connection mode is ended.

2 Claims, 13 Drawing Sheets

FIG. 5

| | | SELECTIVE CONDITION 1a | SELECTIVE CONDITION 1b | SELECTIVE CONDITION 1c |
|---|---|---|---|---|
| RETRY FREQUENT OCCURRENCE SECTION A1–A5 | CLOGGING OF UPPER DIE GUIDE RESULTING FROM CUTTING SHAPE OF TIP OF WIRE ELECTRODE | 1–A1, A2 TRANSFER OF SHAPE OF WIRE ELECTRODE RUNNING PATH | SELECTIVE CONDITION 1b | SELECTIVE CONDITION 1c |
| | | 1–A3 MELTING AND DEFORMATION OF WIRE ELECTRODE | SELECTIVE CONDITION 2a | SELECTIVE CONDITION 2b |
| | | 1–A4, A5 BENDING AND BREAKAGE OF TIP OF WIRE ELECTRODE | SELECTIVE CONDITION 3a | SELECTIVE CONDITION 3b |
| RETRY FREQUENT OCCURRENCE SECTION A6–A8 | DEVIATION FROM CENTER OF LOWER DIE GUIDE RESULTING FROM WIRE ELECTRODE STRAIGHTNESS | 2a–A6, A7 LOSS OF WIRE ELECTRODE STRAIGHTNESS | SELECTIVE CONDITION 4a | SELECTIVE CONDITION 4b |
| | | 2b–A6, A7 LOSS OF WIRE ELECTRODE STRAIGHTNESS | SELECTIVE CONDITION 5a | SELECTIVE CONDITION 5b |
| | | 2–A8 TRANSFER OF SHAPE OF WIRE ELECTRODE RUNNING PATH | SELECTIVE CONDITION 6a | SELECTIVE CONDITION 6b |
| RETRY FREQUENT OCCURRENCE SECTION A9–A10 | CLOGGING OF LOWER GUIDE CAUSED BY FLAW ON SURFACE OF WIRE ELECTRODE RESULTING FROM WEAR OF CHUCK PART ELECTRODE | 3–A9 WEAR OF CUTTING ELECTRODE | SELECTIVE CONDITION 7a | SELECTIVE CONDITION 7b |
| | | 3–A10 LOSS OF WIRE ELECTRODE STRAIGHTNESS | SELECTIVE CONDITION 8a | SELECTIVE CONDITION 8b |

WIRE ELECTRIC DISCHARGE MACHINING APPARATUS HAVING FUNCTION OF AUTOMATICALLY SELECTING AUTOMATIC WIRE CONNECTING PARAMETER

BACKGROUND OF THE INVENTION

1. Field of the Invention

The present invention relates to a wire electric discharge machining apparatus having a function of determining the tendency of a wire cutting state during an automatic wire connecting operation to automatically select a cutting condition.

2. Description of the Related Art

In the case of occurrence of wire breakage or cutting for the next machining-rewind-tip cutting-wire connecting operation-failure, automatic wire connection in wire electric discharge machining is completed by processes of retry repetition-wire connecting through upper and lower die guides-detection of wire connection by detection part.

The automatic wire connection has two steps. The cutting of the tip of a wire electrode line as one of the steps is performed in order to eliminate the bending of the tip of the wire electrode line caused by the wire breakage during machining of a workpiece or remove a flaw on the surface of the wire electrode line that tends to be caught on upper and lower die guides that holds the wire electrode line above and below the workpiece to reproduce a fine tip required for smooth wire connection of the wire electrode line (i.e., a straight tip having a smooth surface).

The wire cutting operation is normally performed by annealing the wire electrode line. In this method, the wire electrode line to be annealed is clamped by a pair of current-carrying electrodes disposed in upper and lower portions of an automatic wire-connection unit, and the clamped wire electrode line is energized while an annealing torque is applied thereto. Subsequently, the wire electrode line annealed by electrical resistance heat generation is cut by generating a cutting start torque in a wire rewind direction using a brake roller. Cutting air injected into an upper pipe at the same time has an important role of determining the cutting position of the wire electrode line and stabilizing the straightness of the cut wire electrode line. Japanese Patent Application Laid-open No. 6-304819 discloses a technology in which an annealing effect when energization cutting is performed can be effectively utilized in a wire electric discharge machining apparatus having a wire cutting mechanism using an energization cutting method.

The wire electrode line of which the tip portion is already cut sequentially reaches, according to a predetermined sequence, upper die guide—workpiece—lower die guide—lower die guide roller—lower pipe—feed part (pinch roller, feed roller)—wire connection completion detection plate, whereby the automatic wire connection of the wire electrode line is completed.

At the same time, in the automatic wire connecting operation, a wire connection state and a wire connection tendency are constantly monitored by a retry position counter function indicative of the position of a wire connection failure of a retry and the number of wire connection failures. Accordingly, when the automatic wire connection has a problem and the retry frequently occurs at a specific position, the wire connection error factor peculiar to the position is pre-identified through experiences or experiments, and hence it is possible to track down the cause. Japanese Patent Application Laid-open No. H7-112328 discloses a technology in which the degree of an abnormal state of a position of each mechanism part of a wire electric discharge machining apparatus through which a wire electrode line passes is displayed in association with characteristics of clogging with the wire electrode line peculiar to the position. In addition, Japanese Patent Application Laid-open No. 7-24643 discloses a technology regarding wire trouble occurrence position detection in a wire electric discharge machining apparatus.

The sequence of the automatic wire connection is operated according to a series of preset parameters, and hence the sequence thereof is based on the assumption of a stable wire connection environment by optimum mechanical adjustment and quality of the wire electrode and the margin of an excellent cutting region is relatively small. Consequently, when a problem exceeding the margin occurs and it is not possible to cope with the problem using a default parameter set as the initial value, there has been a possibility that a cutting/wire connection error occurs and the problem eventually leads to an emergency suspension.

In addition, with the function of the automatic wire connection of the current electric discharge machining apparatus, it is possible to quickly narrow down the cause by monitoring of the retry position counter function, but the final correction is based on cutting/wire connection parameter correction manually performed by an operator. Consequently, the response to the factor for the cutting/wire connection error of the wire electrode line is varied depending on differences in experience and knowledge at the operator level, and there is a problem in terms of working efficiency. Further, in terms of the promotion of automation of machining of the workpiece, the retry position counter function is limited only to the monitoring function, and the retry position counter function has not been related directly to active correction of the error basically.

SUMMARY OF THE INVENTION

In view of the above-described problem of the conventional art, an object of the present invention is to provide a wire electric discharge machining apparatus having a function of automatically selecting an automatic wire-connection parameter that, when cutting/wire connection parameters set as default data in the wire electric discharge machining apparatus are not suitable for automatic wire connection so that a retry tends to frequently occur at a specific position, determines the typical cause based on data on a wire retry position and the number of times of the wire retry of a retry position counter function and automatically selects an optimum condition from among parameter sets that are made into conditions according to the retry cause to thereby automate a correction operation, liberate an operator from the monitoring of an error, and achieve higher levels of labor saving and automation.

A wire electric discharge machining apparatus according to the present invention has a function of automatically selecting an automatic wire-connection parameter, and includes an execution part that executes automatic wire connection according to a plurality of parameters determining a condition for performing the automatic wire connection, a wire electrode line wire-connection failure section detection part that detects a wire-connection failure section in a running path of a wire electrode when wire connection by the automatic wire connection by the execution section is unsuccessful, a count/storage part that counts and stores the number of failures of the wire connection in the wire electrode line wire-connection failure section, a parameter set storage part that stores a parameter set as a combination of the plurality of parameters in association with the wire electrode line wire-connection failure section, and a parameter set switching part that selects and adopts, based on a count value stored in the count/storage part, the parameter set as a default condition for performing an automatic wire connecting operation from among the parameter sets each associated with the wire electrode line wire-connection failure section and stored in the parameter set storage part when the wire connection is unsuccessful even in a preset wire connecting operation.

The wire electric discharge machining apparatus can further include a message storage part that stores a message for warning an operator in association with the wire electrode line wire-connection failure section, and a display part that displays, when the wire connection is unsuccessful in the wire electrode line wire-connection failure section after the parameter set is selected and adopted in the parameter set switching part, the message associated with the wire electrode line wire-connection failure section stored in the message storage part.

According to the present invention, it is possible to provide the wire electric discharge machining apparatus having the function of automatically selecting the automatic wire-connection parameter that, when cutting/wire connection parameters set as default data in the wire electric discharge machining apparatus are not suitable for the automatic wire connection so that the retry tends to frequently occur at a specific position, determines the typical cause based on data on the wire retry position and the number of times of the wire retry of the retry position counter function and automatically selects the optimum condition from among parameter sets that are made into conditions according to the retry cause to thereby automate the correction operation, liberate an operator from the monitoring of an error, and achieve higher levels of labor saving and automation.

BRIEF DESCRIPTION OF THE DRAWINGS

The foregoing purposes and features of the present invention, as well as other purposes and features, will become apparent from the following description of an embodiment with reference to the accompanying drawings in which:

FIG. 5 is a table for explaining the processes of FIG. 4 in greater detail;

DESCRIPTION OF THE PREFERRED EMBODIMENTS

Figure 1:
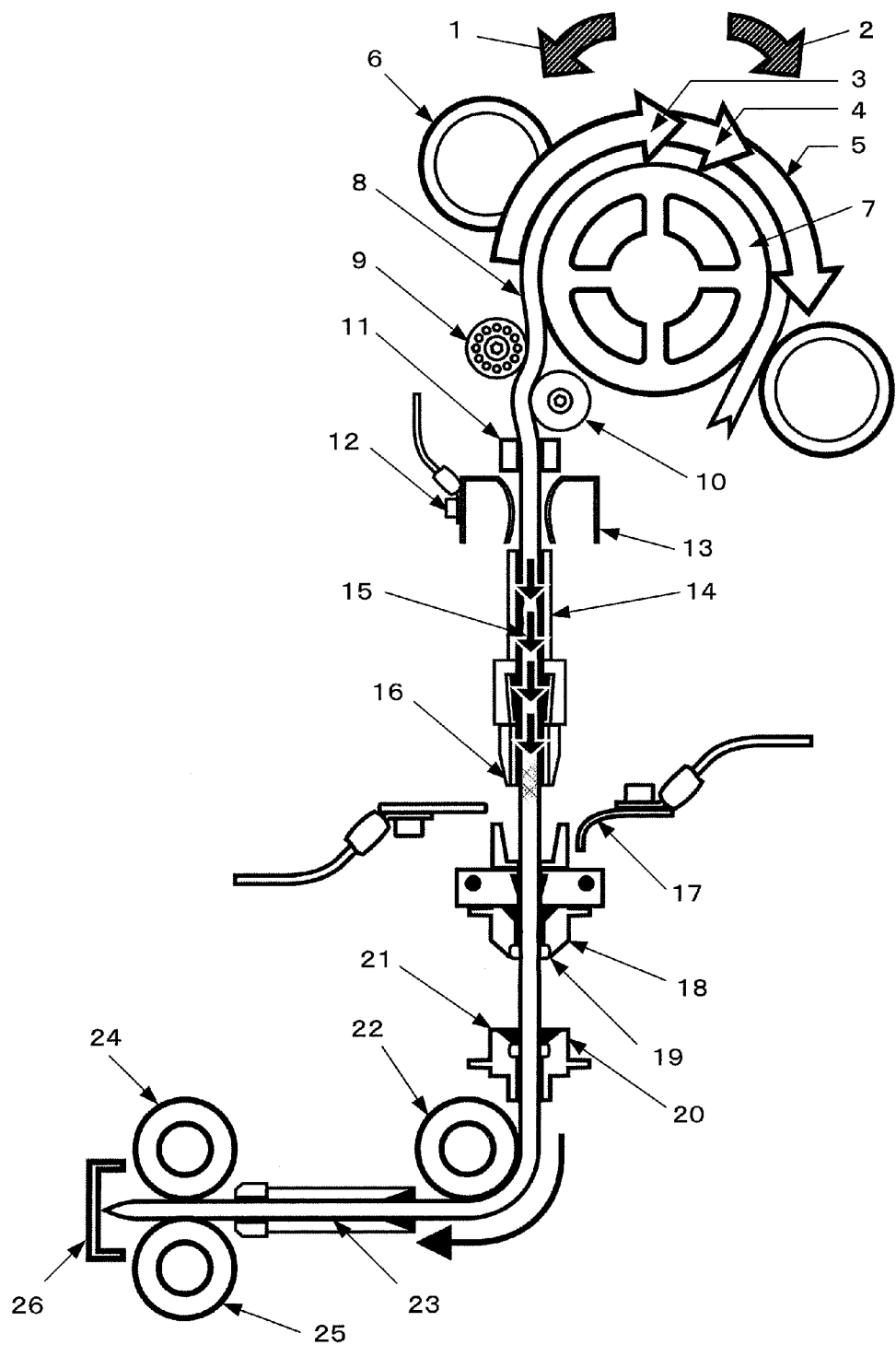
FIG. 1 is a view explaining a basic configuration of a wire electric discharge machining apparatus that performs automatic wire connection of a wire electrode.

FIG. 1 is a view explaining the basic configuration of a wire electric discharge machining apparatus that performs automatic wire connection of a wire electrode.

In the case of occurrence of wire breakage or cutting for the next machining-rewind-tip cutting-wire connecting operation-failure, the automatic wire connection in the wire electric discharge machining is completed by processes of retry repetition-wire connection through upper and lower die guides-detection or wire connection by a detection part.

The automatic wire connection includes two steps. The cutting of the tip of a wire electrode line 8 as one of the steps is performed in order to eliminate the bending of the tip of the wire electrode line 8 caused by the wire breakage during machining of a workpiece (not shown) or remove a flaw on the surface of the wire electrode line 8 that tends to be caught on upper and lower die guides 18 and 21 that hold the wire electrode line 8 above and below the workpiece to reproduce a fine tip required for smooth wire connection of the wire electrode line 8 (i.e., a straight tip having a smooth surface).

The wire cutting operation is normally performed by annealing the wire electrode line. In this method, the wire electrode line 8 to be annealed is clamped by a pair of current-carrying electrodes (chuck electrode parts 12 and 13 and a detection electrode part 17) disposed in upper and lower portions of an automatic wire-connection unit, and the clamped wire electrode line is energized while an annealing torque 3 is applied thereto. Subsequently, the wire electrode line 8 annealed by electrical resistance heat generation is cut by generating a cutting start torque 4 in a wire rewind direction 2 using a brake roller 7. Cutting air 15 injected into an upper pipe 14 at the same time has an important role of determining the cutting position of the wire electrode line 8 and stabilizing the straightness of the cut wire electrode line 8.

The cut tip portion of the wire electrode line 8 of which the tip portion is already cut sequentially reaches, according to a predetermined sequence, upper die guide 18—workpiece (not shown)—lower die guide 21—lower guide roller 22—lower pipe 23—feed part (pinch roller 24, feed roller 25)—wire connection completion detection plate 26, whereby the automatic wire connection of the wire electrode line 8 is completed.

At the same time, in the automatic wire connecting operation, the wire connection state and its tendency are constantly monitored by a retry position counter function that counts and stores count values indicative of the position of a wire connection failure of a retry and the number of wire connection failures thereof. Accordingly, when the automatic wire connection has a problem and the retry frequently occurs at a specific position, the wire connection error factor peculiar to the position is pre-identified through experiences or experiments, and hence it is possible to track down the cause. Note that the above-described monitoring function is well-known in the wire electric discharge machining apparatus so that a detailed description thereof is omitted.

The processes of the automatic wire connection comprises cutting of the wire electrode line 8 and wire connection, and the factor of enhancing wire connection characteristics of the wire electrode line 8 is based on an improvement in the quality of cutting of the wire electrode line 8. The wire electrode line 8 that is cut by using appropriate cutting parameters has high straightness and a wire flaw (a flaw formed on the surface of the wire electrode line 8) caused by the cutting electrodes (the chuck electrode parts 12 and 13) is minimized so that it becomes possible to smoothly send the wire electrode line 8 from the upper die guide 18 to a feed part (24 and 25) where wire connection detection using a wire connection completion detection plate 26 is performed to achieve high wire connection characteristics.

Parameters that are effective in improving the quality of cutting of the wire electrode line 8 are as follows. As described later, the following parameters influencing the cutting quality are made into conditions for each retry factor and are used as automatic selection elements.

Annealing torque 3: A cutting tension that stretches the wire electrode line 8 heated by annealing using energization and straightens the wire electrode line 8.

Cutting start torque 4: A cutting tension that cuts the wire electrode line 8 straightened by annealing at its tip portion with a tension torque.

Cutting torque 5: A cutting tension that forcibly applies an excessive torque to the wire electrode line 8 when the wire electrode line 8 cannot be cut by the cutting start torque 4.

Cutting air 15: Air that cools the annealed wire electrode line 8 except for the portion corresponding to the tip of the upper pipe 14 and adjusts the position of the annealed portion remaining at the wire tip portion such that the annealed portion can be cut by pulling with the cutting start torque 4.

In the present invention, the retry occurrence cause of the wire electrode line 8 is associated with each retry position in the retry position counter function, and a wire-cutting parameter condition as the countermeasure against the cause is prepared, whereby it becomes possible to automatically select the parameter. In addition, the causes for the wire connection error include factors that are not included in the parameter condition such as the poor quality of the wire electrode line 8, the wear of the cutting electrode, guide clogging, and the poor assembly of the automatic wire-connection unit, and hence such causes are also simultaneously taught as warnings.

Figure 2:
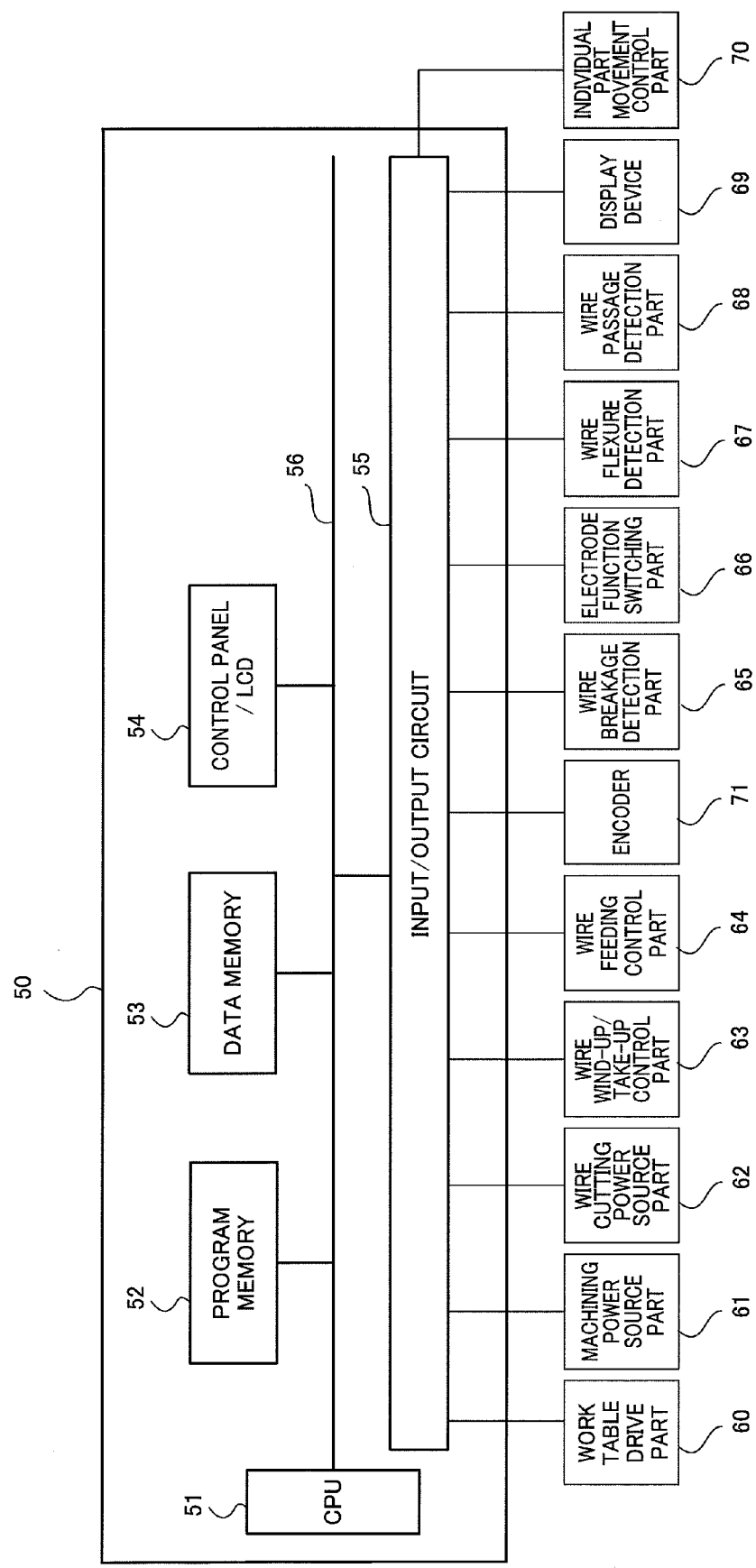
FIG. 2 is a view explaining the outline of the wire electric discharge machining apparatus.

The outline of the wire electric discharge machining apparatus is described with reference to FIG. 2.

A controller 50 of the wire electric discharge machining apparatus includes a central processing unit (hereinafter simply referred to as a "CPU") 51 having a microprocessor and, to the CPU 51, a program memory 52, a data memory 53, a control panel 54 having a liquid crystal display, and an input/output circuit 55 are connected via a bus 56.

The program memory 52 stores various programs for controlling individual parts of the wire electric discharge machining apparatus and the controller 50 of the wire electric discharge machining apparatus. In addition, the data memory 53 stores position data related to a machining program and various setting data for determining other machining conditions, and is also used as a memory for temporarily storing data for various calculations executed by the CPU 51. Further, the data memory 53 has a register area for calculating an output pulse of an encoder 71 and a register area for storing trouble occurrence position data.

To the input/output circuit 55, there are connected a work table drive part 60, a machining power source part 61, a wire cutting power source part 62, a wire wind-up/take-up control part 63, a wire feeding control part 64, the encoder 71, a wire breakage detection part 65, an electrode function switching part 66, a wire flexure detection part 67, a wire passage detection part 68, a display device 69, and an individual part movement control part 70 for controlling other individual parts of the wire electric discharge machining apparatus.

Each of the work table drive part 60 and the machining power source part 61 has a well-known configuration, and is controlled according to a normal method during the execution of the machining. The wire cutting power source part 62 supplies required power to the chuck electrode parts 12 and 13 and the detection electrode part 17 in order to cut the wire electrode line 8 in a heating region in the upper pipe 14 during the wire connecting operation. The wire wind-up/take-up control part 63 drives a motor for driving a wire take-up roll and a wind-up motor (not shown).

The wire feeding control part 64 performs drive control of a motor for driving a wire feeding roll, and the rotation amount of the motor is detected by the encoder 71. The wire breakage detection part 65 detects the wire breakage when the wire breakage occurs during the execution of the machining, and uses a mechanism of the conventional method (e.g., a method in which a current flowing in the wire is detected or a method in which the tension of the take-up roll is detected).

The electrode function switching part 66 switches between the function of each of the chuck electrode parts 12 and 13 as the wire cutting electrode and the function thereof as the wire passage detection electrode. The wire passage detection part 68 detects the electric potential of the wire electrode line 8 when the wire electrode line 8 is connected to a wire passage detection power source (not shown). On the other hand, the wire flexure detection part 67 is connected to the above-mentioned wire flexure detection electrode (not shown) to detect the electric potential of the wire flexure detection electrode, and determines whether or not the electrode is in contact with the wire by using a change in the detected electric potential of the wire flexure detection electrode.

The display device 69 is a device for displaying wire trouble position information in various forms, and is used when, e.g., the wire trouble occurrence position is displayed in real time as a warning, or when the trouble occurrence frequency for each section is shown in the form of a graph in accordance with a display program stored in the program memory 52. The individual part movement control part 70 is a part for controlling opening/closing of the chuck electrode parts 12 and 13 as the cutting electrodes and the descending movement of the upper pipe 14 during the wire connection of the wire electrode line 8.

The memory of the controller 50 of the wire electric discharge machining apparatus stores a program for the position detection/recording of the wire connection trouble and a program for performing the automatic wire connection process. With this arrangement, it can be said that the wire electric discharge machining apparatus has an automatic wire connection device. The provision of these programs is a known art so that a further description thereof is omitted. The storage of these programs in the memory of the controller 50 of the wire electric discharge machining apparatus corresponds to that the wire electric discharge machining apparatus has an "execution part that executes automatic wire connection according to a plurality of parameters determining a condition for performing the automatic wire connection", a "wire electrode line wire-connection failure section detection part that detects a wire-connection failure section in a running path of a wire electrode when wire connection by the automatic wire connection by the execution part is unsuccessful", and a "count/storage part that counts and stores the number of failures of the wire connection in the wire electrode line wire-connection failure section" in the present invention. Note that the present embodiment adopts the configuration in which the CPU 51 is used also for NC control of work-table position so that the wire breakage position detection/recording process is performed through a task process.

Figure 3:
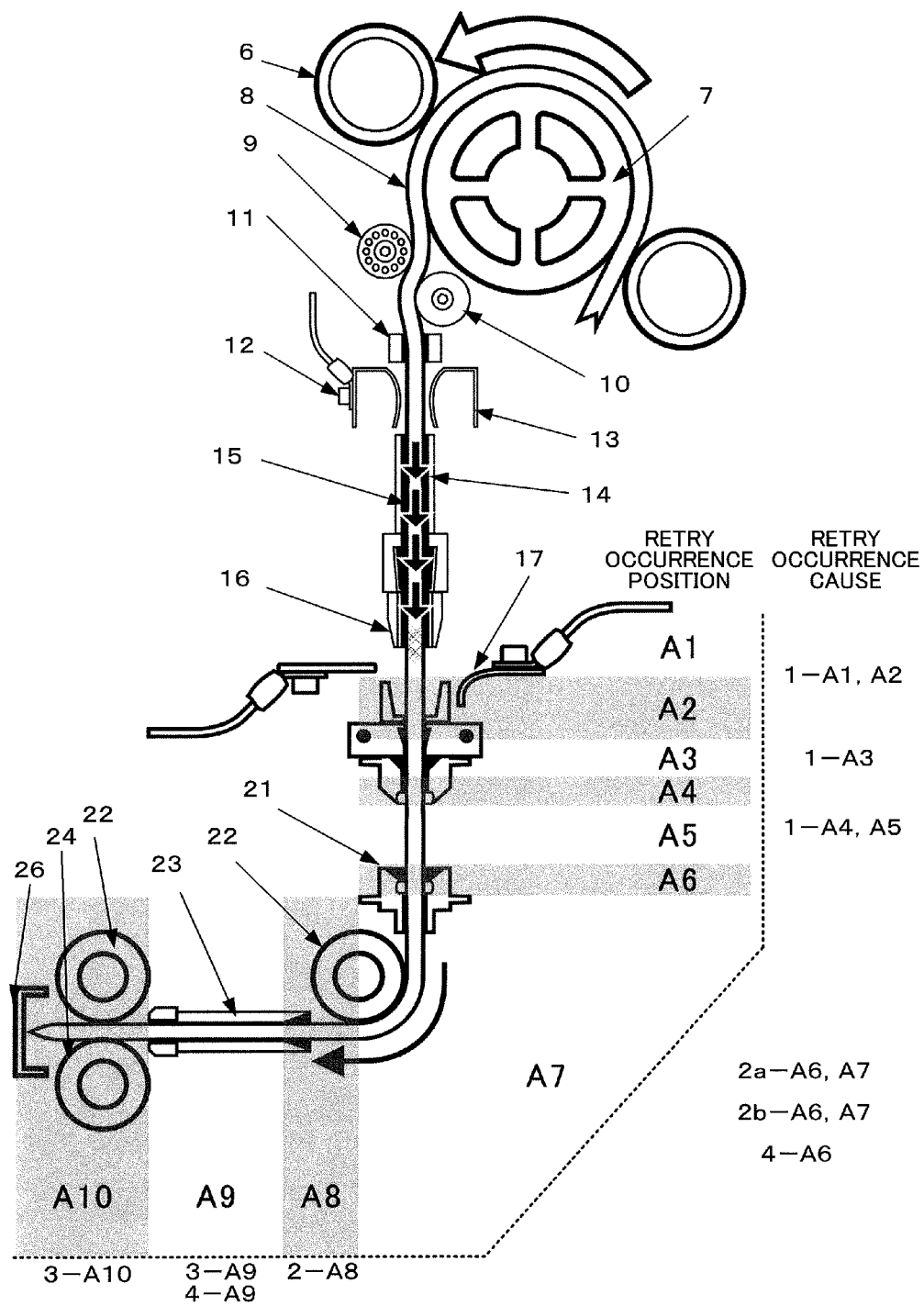
FIG. 3 is a view explaining a fault occurrence position where a retry needs to be performed (retry position) and a retry occurrence cause.

The fault occurrence position where a retry needs to be performed (hereinafter referred to as a "retry occurrence position") and a retry occurrence cause are described with reference to FIG. 3.

The retry occurrence position due to poor adjustment of cutting-related parameters and its cause are described in association with each other. Each of reference numerals A1, A2, A3, A4, A5, A6, A7, A8, A9, and A10 denotes the retry occurrence position (fault occurrence position where the retry needs to be performed). The "position" mentioned herein means a section having a predetermined width, as shown in FIG. 3. On the other hand, each of 1-A1, A2; 1-A3; 1-A4, A5; 2a-A6, A7; 2b-A6, A7; 4-A6; 2-A8; 3-A9; 4-A9; and 3-A10 denotes the retry occurrence cause.

Hereinbelow, the retry occurrence position and the retry occurrence cause are described in association with each other.
(Retry Occurrence Positions A1 and A2)

Figure 6:
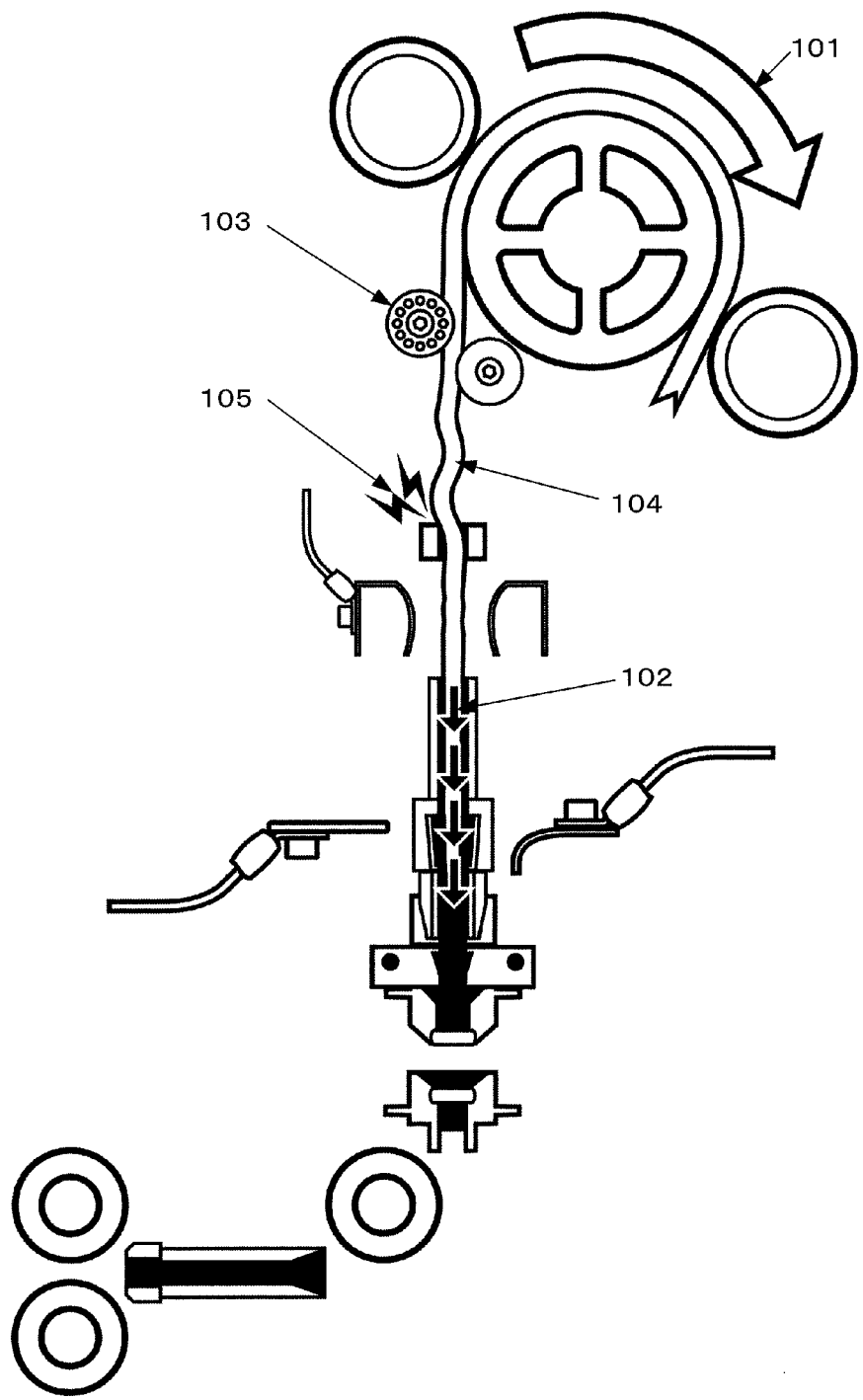
FIG. 6 is a view explaining the relationship between retry occurrence positions (A1 and A2) and the retry occurrence cause.

FIG. 6 is a view explaining the relationship between the retry occurrence positions (A1 and A2) and the retry occurrence cause (1-A1, A2). The relationship therebetween is explained with reference to FIG. 1 as well.

A reference numeral 101 denotes that the cutting start torque value is set to be excessive, a reference numeral 102 denotes that the value of the cutting air is appropriate, a reference numeral 103 denotes that a path shape is transferred to the wire electrode line 8 by the excessively set cutting start torque when the wire electrode line 8 passes between a tension detection roller 9 and a pinch roller 10, a reference numeral 104 denotes the transferred path-shape, and a reference numeral 105 denotes that the path-shape transferred portion comes in contact with a failure detection electrode 11 to cause the retry to occur.
<Retry Occurrence Cause 1-A1, A2>

As denoted by the reference numeral 101, the cutting start torque 4 is set to the excessive value when the wire electrode line 8 is cut, and the wire electrode line 8 that is softened by annealing is thereby strongly pulled. In this case, at the portion between the tension detection roller 9 and the pinch roller 10, the passage shape between the two rollers 9 and 10 is transferred to the wire electrode line 8 as a curve deformation, the curved portion of the wire electrode line 8 comes in contact with the failure detection electrode 11, and the fault of the wire connection of the wire electrode line 8 occurs, i.e., the retry occurs.
(Retry Occurrence Position A3)

Figure 7:
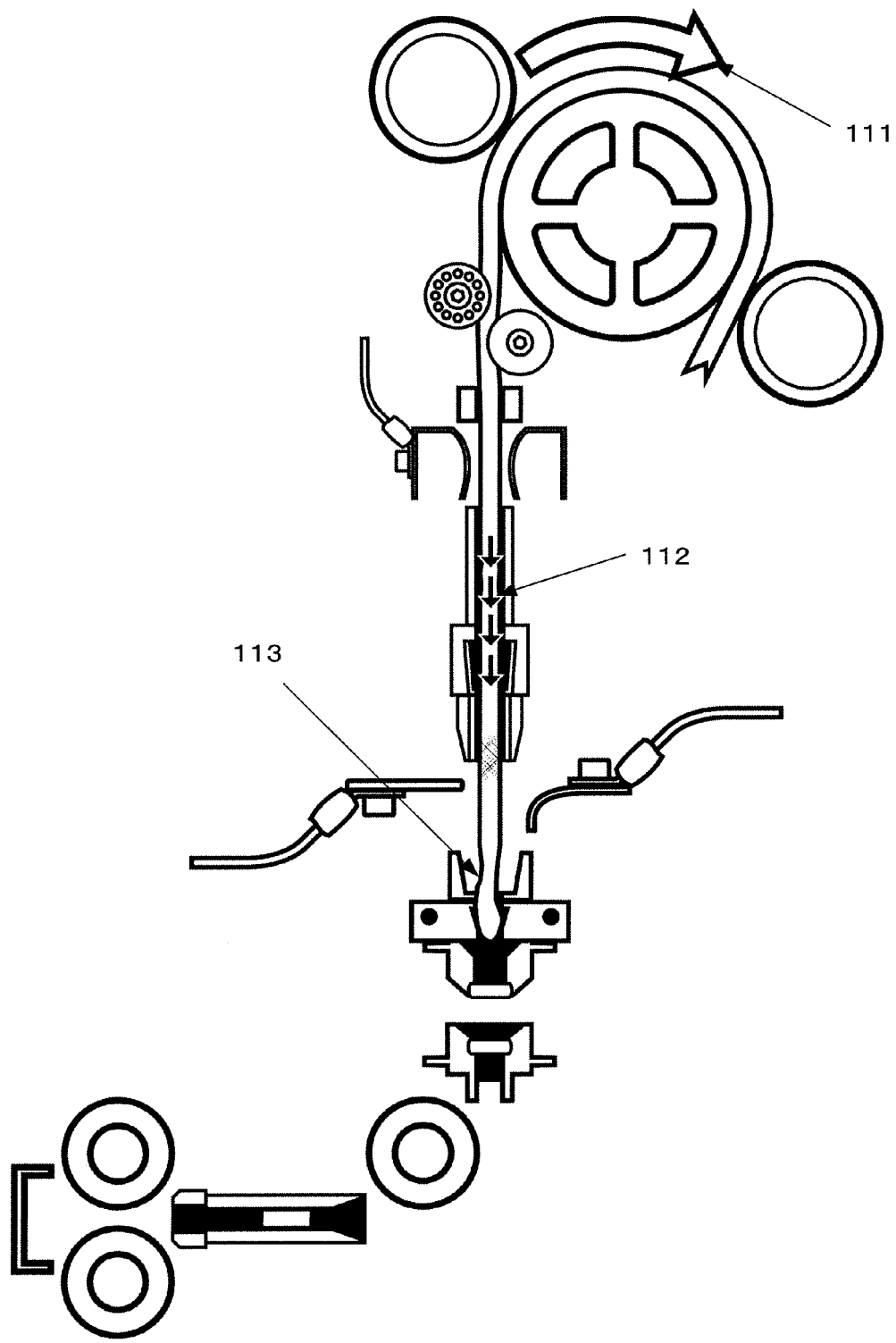
FIG. 7 is a view explaining the relationship between a retry occurrence position (A3) and the retry occurrence cause.

FIG. 7 is a view explaining the relationship between the retry occurrence position A3 and the retry occurrence cause 1-A3. A reference numeral 111 denotes that the cutting start torque value is set to be extremely small, a reference numeral 112 denotes that the cutting air pressure is set to be extremely small, and a reference numeral 113 denotes that the wire electrode line 8 is being heated and it takes time to complete the cutting so that the tip of the wire electrode line 8 is melt to be deformed.
<Retry Occurrence Cause 1-A3>

As denoted by the reference numerals 111 and 112, when the pressure of the cutting air 15 and the cutting start torque 4 are extremely small, at the time of the start of the cutting, the tip of the wire electrode line 8 is brought into an overheated state due to poor cooling in the upper pipe 14 and the pulling of the torque is small so that the wire electrode line 8 is melt in the vicinity of the nozzle of a pipe head 16, the tip portion of the wire electrode line 8 is deformed and hardened, and it becomes difficult for the wire electrode line 8 to pass through the upper die guide 18.
(Retry Occurrence Positions A4 and A5)

Figure 8:
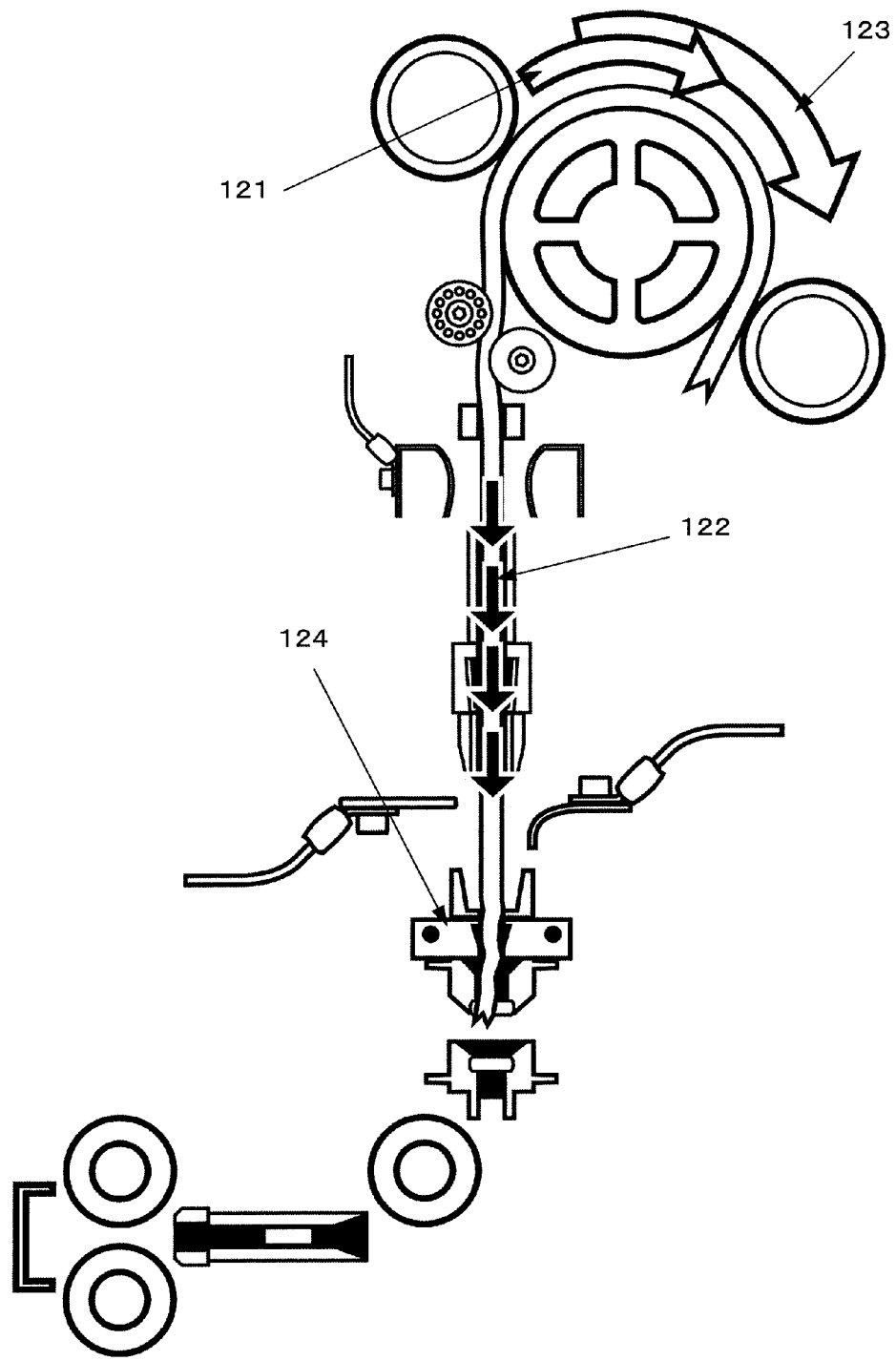
FIG. 8 is a view explaining the relationship between retry occurrence positions (A4 and A5) and the retry occurrence cause.

FIG. 8 is a view explaining the relationship between the retry occurrence positions (A4 and A5) and the retry occurrence cause (1-A4, A5). A reference numeral 121 denotes that the cutting start torque value is set to be appropriate or extremely small, a reference numeral 122 denotes that the cutting air pressure is set to be excessive, and a reference numeral 124 denotes that the wire electrode line 8 is cut by a large force of the cutting torque due to overcooling caused by the excessive cutting air pressure, and hence the wire electrode line 8 is broken and bent and the guide is clogged with the wire electrode line 8 when the wire electrode line 8 passes through the guide.
<Retry Occurrence Cause 1-A4, A5>

As denoted by the reference numeral 122, when the pressure of the cutting air 15 is excessive and the cutting start torque 4 is appropriate or small, the wire electrode line 8 is overcooled due to the excessive pressure of the cutting air 15 to become difficult to cut, the torque is switched from the cutting start torque 4 to the strong cutting torque 5 so that the tip portion of the strongly pulled wire electrode line 8 is bent or broken by a stress and the tip comes in contact with a PCD (polycrystalline diamond) 19 surface having high abrasion resistance and buckles when the wire electrode line 8 passes through the upper die guide 18, and the wire connection error thereby occurs.
(Retry Occurrence Positions A6 to A8)

Figure 9:
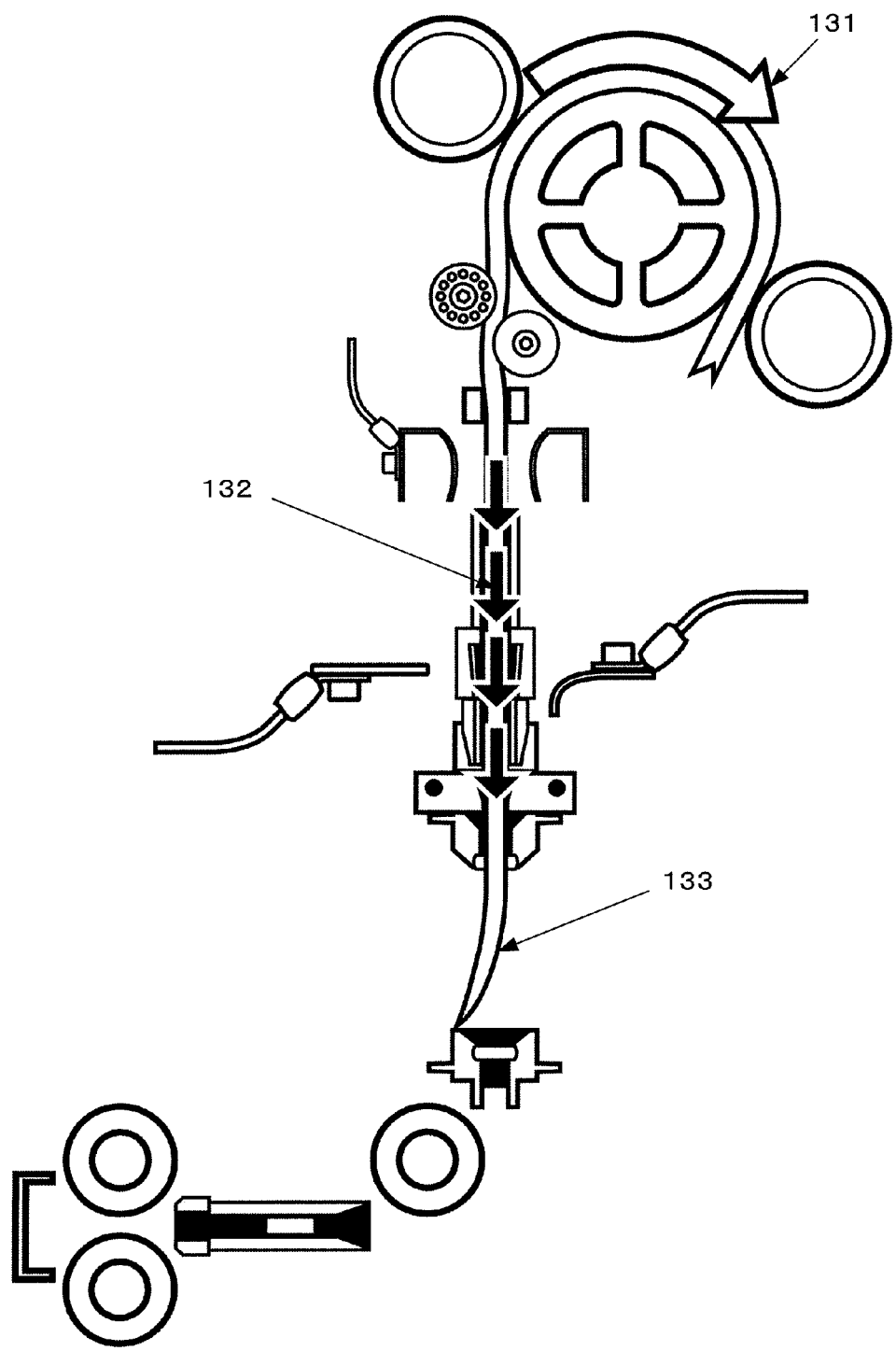
FIG. 9 is a view explaining the relationship between retry occurrence positions (A6 and A7) and the retry occurrence cause.

FIG. 9 is a view explaining the relationship between the retry occurrence positions (A6 to A8) and the retry occurrence cause (2a-A6, A7). A reference numeral 131 denotes that the cutting start torque value is set to be appropriate or extremely small, a reference numeral 132 denotes that the cutting air is set to be excessive, and a reference numeral 133 denotes that the stress is generated during the cutting due to overcooling caused by the excessive cutting air pressure so that the wire electrode is bent by the reaction and its straightness is lost.
<Retry Occurrence Cause 2a-A6, A7>

When the pressure of the cutting air 15 is excessive, the wire electrode line 8 becomes difficult to cut due to the overcooling, the strongly pulled wire tip portion is curled by the reaction, and the straightness thereof is lost so that it is not possible to feed the wire to the center of the lower die guide 21.

Figure 10:
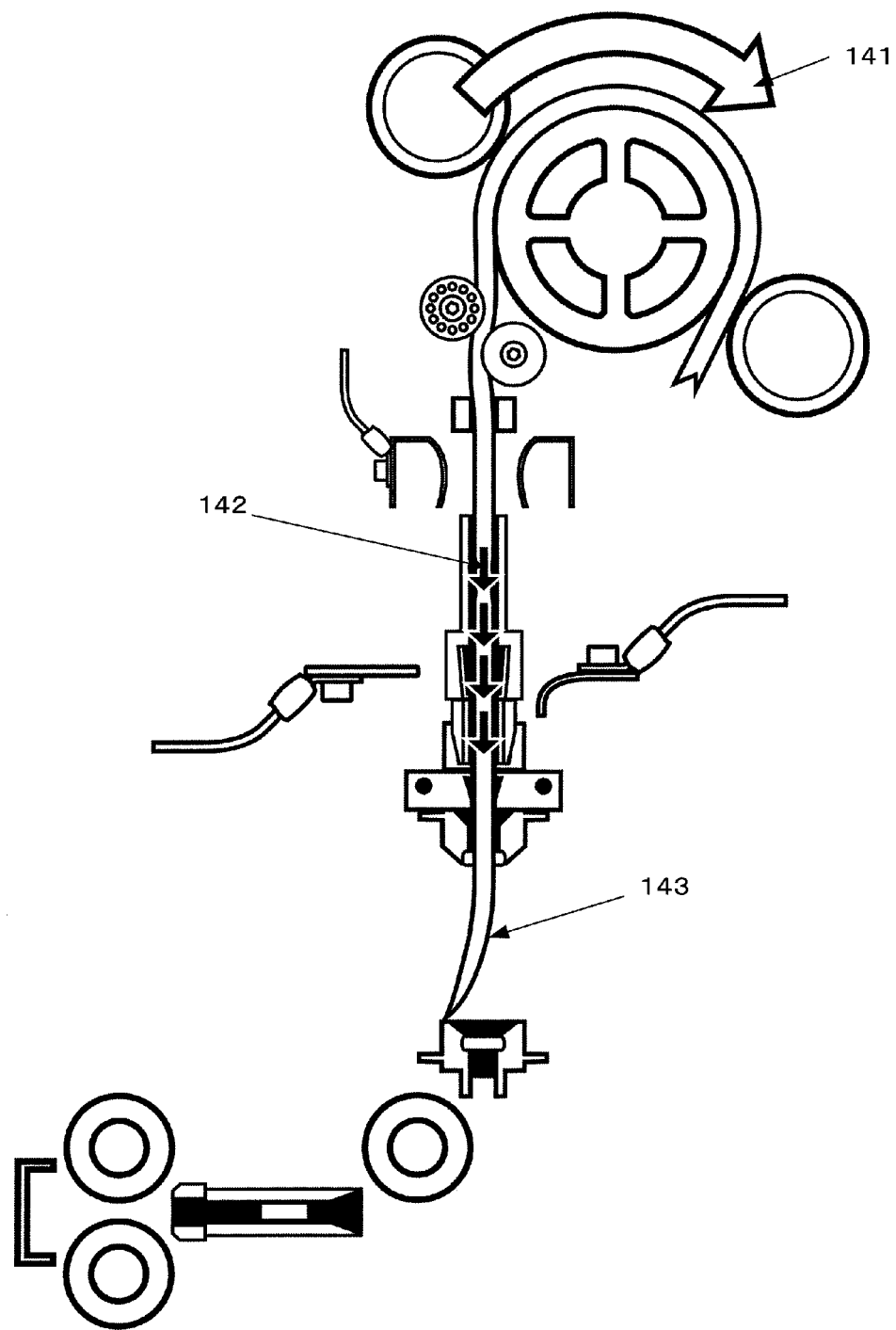
FIG. 10 is a view explaining the relationship between the retry occurrence positions (A6 and A7) and the retry occurrence cause.

In addition, FIG. 10 is a view explaining the relationship between the retry occurrence positions (A6 to A8) and the retry occurrence cause (2b-A6, A7). A reference numeral 141 denotes that the cutting start torque value is set to be excessive, a reference numeral 142 denotes that the pressure of the cutting air is set to be appropriate or slightly excessive, and a reference numeral 143 denotes that the stress is generated during the cutting due to the excessive cutting start torque so that the wire electrode line 8 is bent by the reaction and the straightness thereof is lost.
<Retry Occurrence Cause 2b-A6, A7>

When the cutting start torque 4 is excessive, the wire tip portion that is strongly pulled during the cutting is curled by the stress and the straightness thereof is lost. As a result, it is not possible to feed the wire electrode line 8 to the center of the lower die guide 21.

(Retry Occurrence Position A8)

Figure 11:
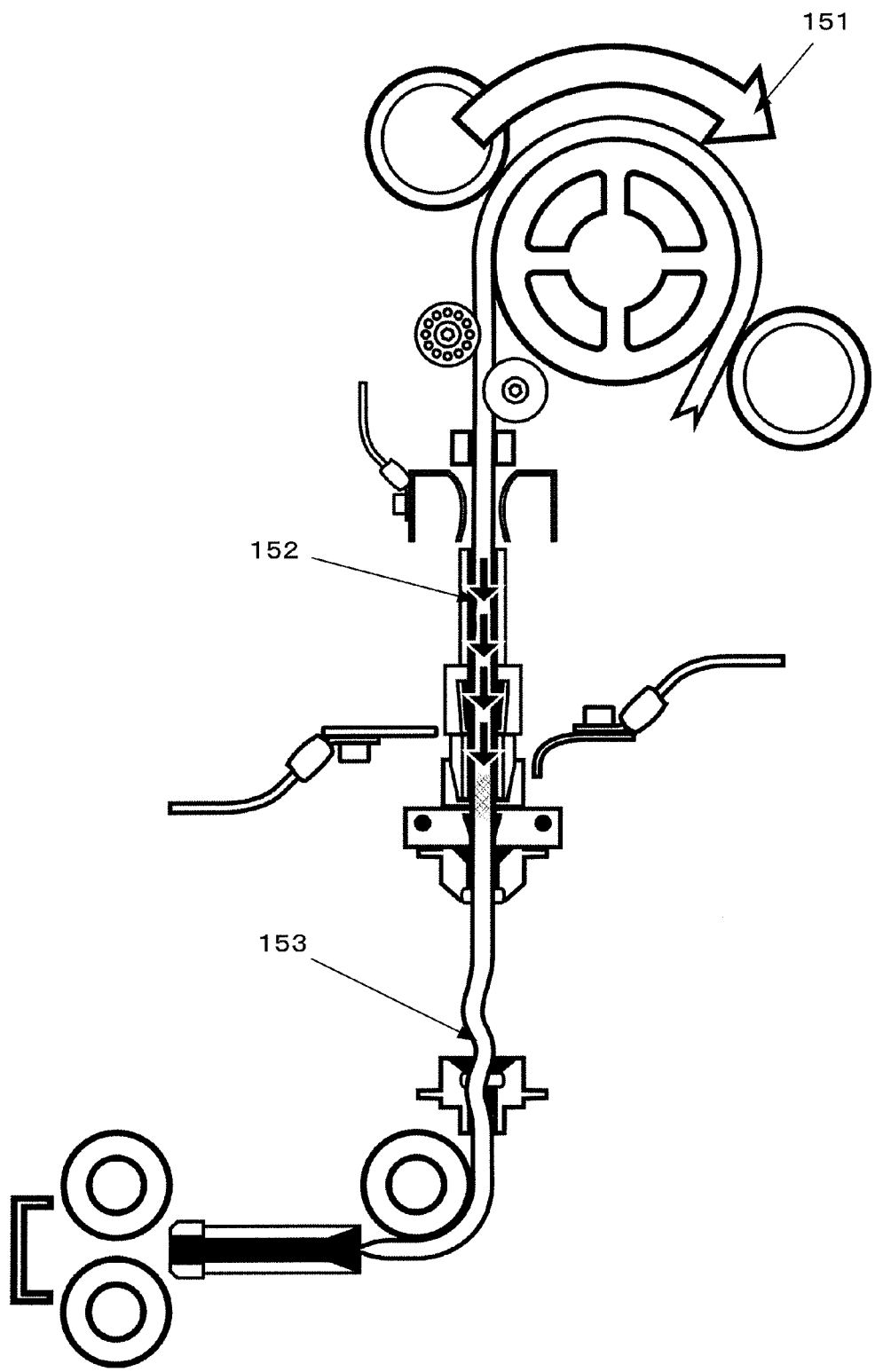
FIG. 11 is a view explaining the relationship between a retry occurrence position (A8) and the retry occurrence cause.

FIG. 11 is a view explaining the relationship between the retry occurrence position (A8) and the retry occurrence cause (2-A8). A reference numeral 151 denotes that the cutting start torque value is set to be excessive, a reference numeral 152 denotes that the pressure of the cutting air 15 is set to be appropriate or slightly excessive, and a reference numeral 153 denotes that the path-shape transferred portion resulting from the excessively set cutting start torque when the wire electrode line 8 passes between the tension detection roller 9 and the pinch roller 10 comes in contact with the lower die guide 21, and the lower die guide 21 is clogged therewith.

<Retry Occurrence Cause 2-A8>

When the wire electrode line 8 that is softened by annealing is strongly pulled due to the excessive cutting start torque 4 between the tension detection roller 9 and the pinch roller 10 during the cutting, the passage shape between the two rollers 9 and 10 is transferred to the wire electrode line 8 as the curve deformation, the curved portion becomes likely to be caught on a PCD (polycrystalline diamond) 20 surface when the curved portion passes through the lower die guide 21, and the passage error is thereby caused.

(Retry Occurrence Position A9)

Figure 12:
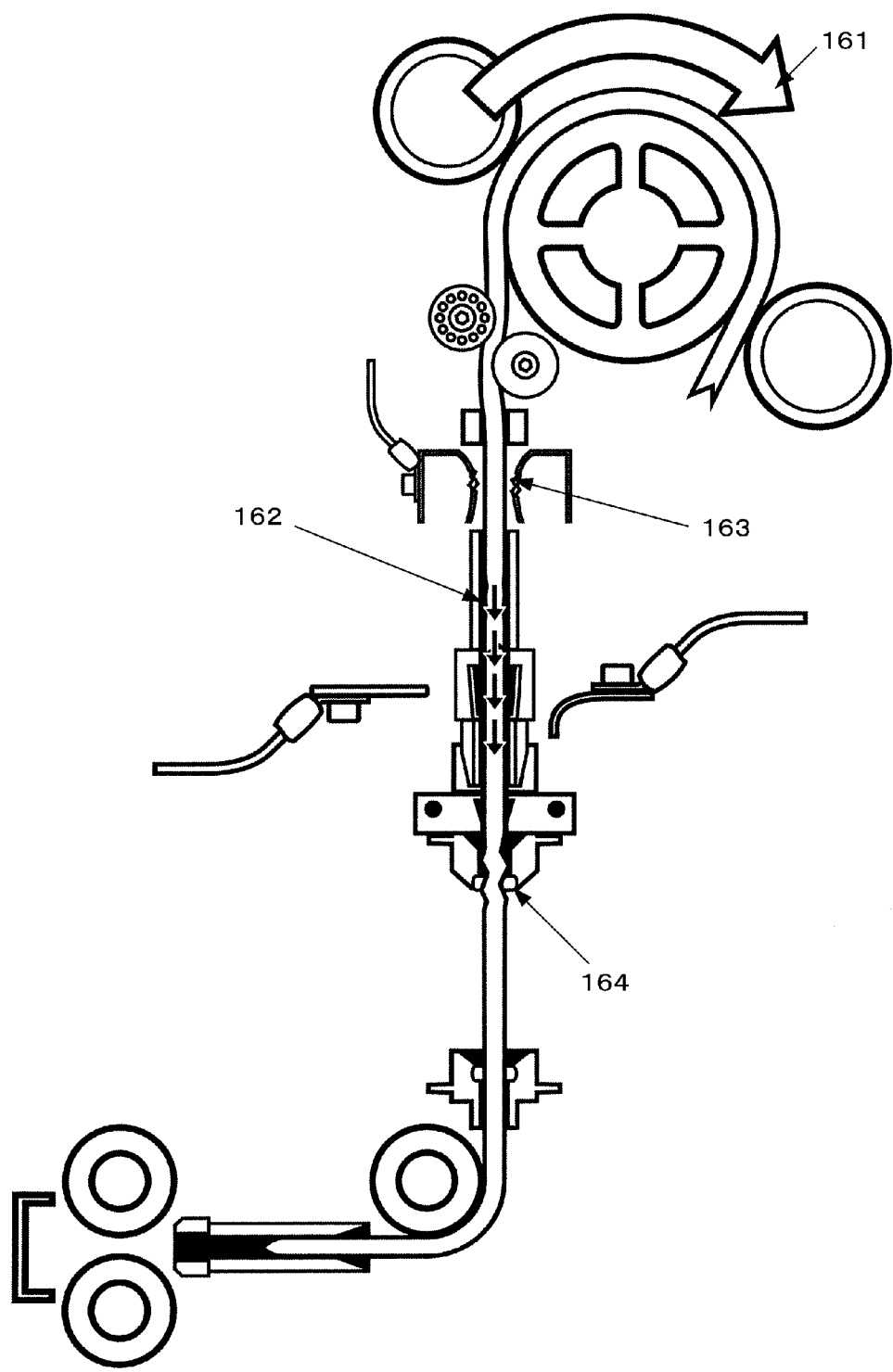
FIG. 12 is a view explaining the relationship between a retry occurrence position (A9) and the retry occurrence cause.

FIG. 12 is a view explaining the relationship between the retry occurrence position (A9) and the retry occurrence cause (3-A9). A reference numeral 161 denotes that the cutting start torque value is set to be slightly excessive, a reference numeral 162 denotes that the pressure of the cutting air is set to be appropriate or slightly extremely small, a reference numeral 163 denotes that an electrode transfer flaw is generated by micro discharge of the chuck part electrode and the flaw becomes likely to be transferred to the wire electrode by the excessively set cutting torque, and a reference numeral 164 denotes that the wire transfer flaw comes in contact with the upper die guide 18 and the upper die guide 18 is clogged therewith.

<Retry Occurrence Cause 3-A9>

Cooling becomes insufficient due to the excessive cutting start torque 4 and the extremely small cutting air 15, the amount of metal powder adhering to the cutting electrodes (12 and 13) is increased by an increase in the temperature of the wire electrode line 8 during the annealing, the wear of the cutting electrodes (12 and 13) is accelerated by an increase in micro discharge, and the transfer flaw formed on the wire electrode line 8 at the time of start of the cutting is deepened. As a result, when the wire electrode line 8 passes through the upper die guide 18, the wire electrode line 8 comes in contact with the PCD (polycrystalline diamond) 19 surface and the upper die guide 18 is clogged therewith.

(Retry Occurrence Position A10)

Figure 13:
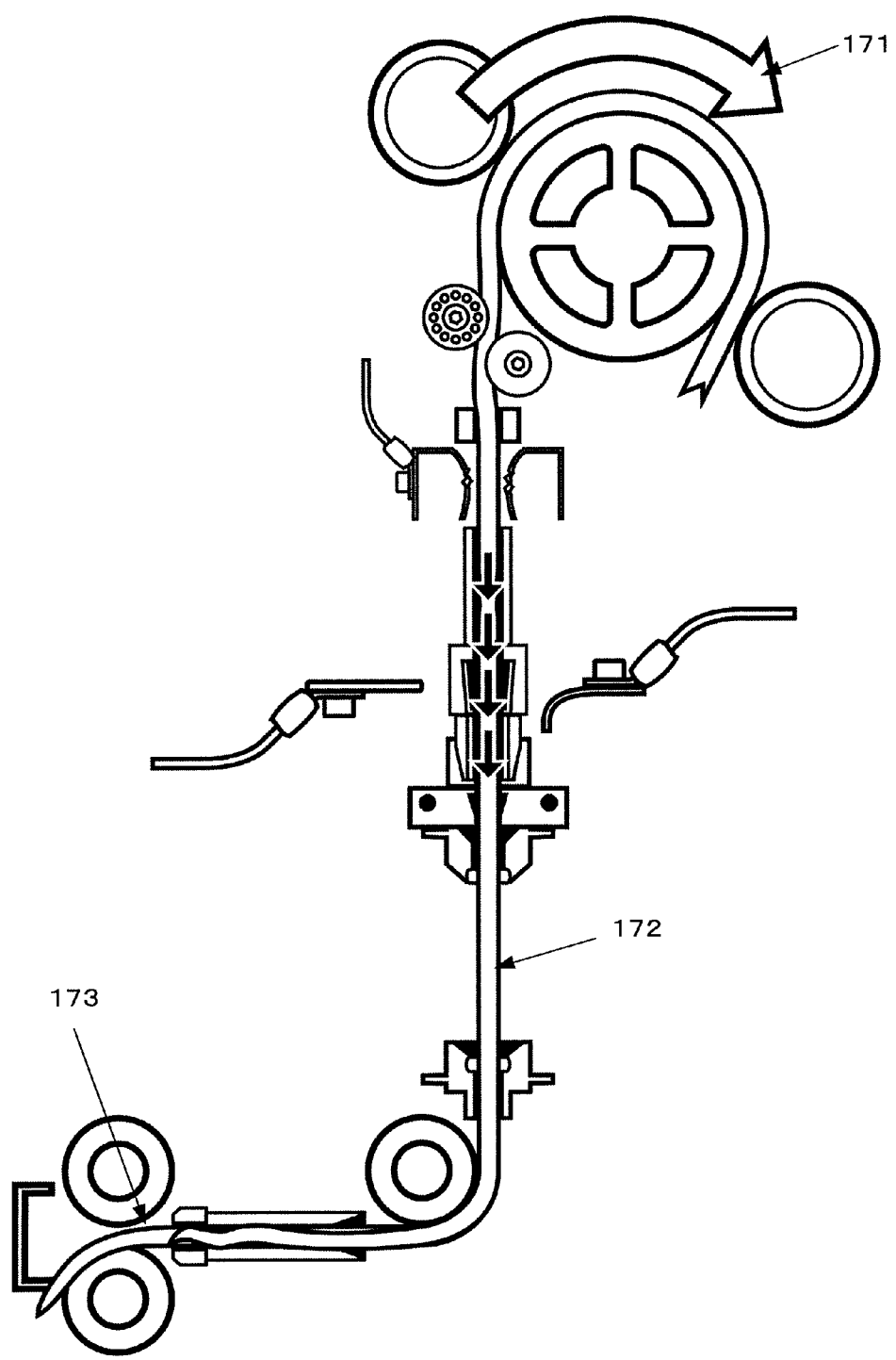
FIG. 13 is a view explaining the relationship between a retry occurrence position (A10) and the retry occurrence cause.

FIG. 13 is a view explaining the relationship between the retry occurrence position (A10) and the retry occurrence cause (3-A10). A reference numeral 171 denotes that the cutting start torque value is fed to be slightly excessive, and a reference numeral 172 denotes that the stress is generated during the cutting due to the excessively set cutting start torque value so that the wire electrode line 8 is bent by the reaction and the straightness thereof is lost. A reference numeral 173 denotes that the bent wire functions as drag in the lower pipe 23 to cause clogging by buckling before the feed roller or the bent wire is sent in an irregular direction to be deviated.

<Retry Occurrence Cause 3-A10>

When the tip portion of the wire electrode line 8 is significantly curled by the stress by setting the excessive cutting start torque 4, the curled wire electrode line 8 functions as drag when it passes through the lower pipe 23, and the wire electrode line 8 buckles at the exit before the feed roller 25 to cause the wire connection error, or the wire electrode line 8 is deviated at the feed roller 25 and allows the wire connecting distance to be exceeded without coming in contact with the wire connection completion detection plate 26.

In the present invention, when the number of times of the retry displayed at each retry position of the retry position counter function reaches the predetermined number of times at the corresponding retry position, the method of automatically selecting the automatic wire-connection parameter automatically selects the selective condition of the parameter set so as to be able to avert the retry cause peculiar to the retry position that is divided into A1 to A10 in the wire running path of upper die guide 18—lower die guide 21—workpiece—lower guide roller 22—lower pipe 23—feed part (25 and 24), in place of default parameters that are set for each of wire line types such as a solid line, a soft line, a thin line, and other special lines, and wire line diameters.

<Retry Occurrence Cause 4-A6>

When the straightness of the wire is not improved even after the switching of the cutting condition by the automatic selection function and the wire connection error is caused in the lower die guide 21, a message indicative of the adjustment of the electrode contact position of the detection electrode part 17 with the wire electrode line 8 at the center, or the setting of the detection electrode part 17 and the inspection of the assembly of the automatic wire-connection unit is displayed on the operation screen in order to warn an operator.

<Retry Occurrence Cause 4-A9>

When the retry frequently occurs at A9 and the situation is not improved even after the switching of the cutting condition by the automatic selection function, the contact positions of the cutting electrodes (12, 13, and 17) and the pushing amount of wire holding are adjusted such that the wire reaches the center. Alternatively, a message indicative of the inspection and the replacement of the chuck electrode due to the wear of the cutting electrodes (12 and 13) caused by the wire metal powder and the micro discharge is displayed on the operation screen in order to warn the operator.

Figure 4:
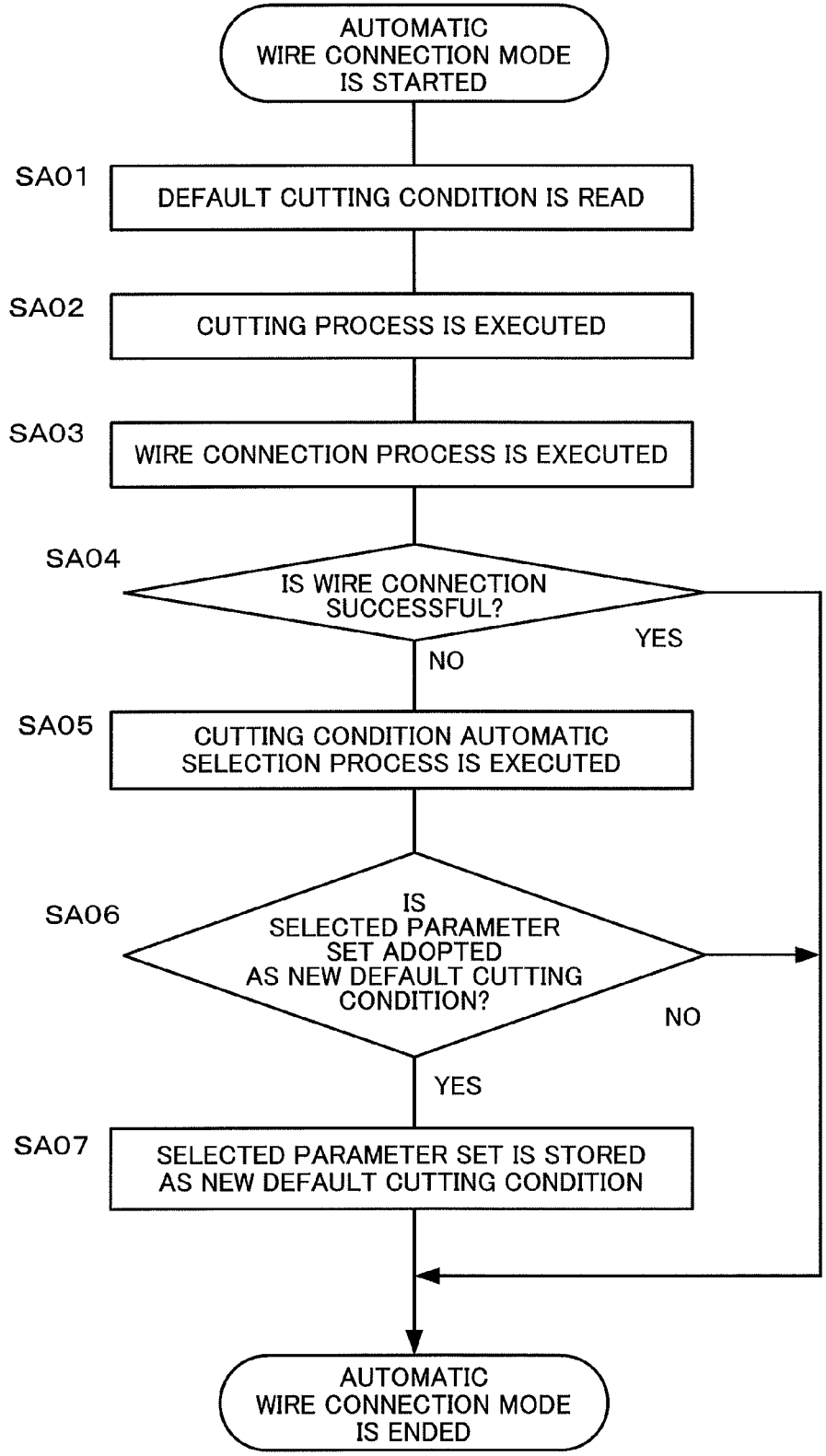
FIG. 4 is a flowchart explaining processes for automatically selecting a cutting condition.

Next, a description is given of processes for automatically selecting the countermeasure corresponding to the respective retry occurrence causes according to the present invention with reference to the flowchart of FIG. 4 and the table of FIG. 5.

In the countermeasure against the retry of the wire electrode line 8, selective conditions a, b, and c each as a set of parameters suitable for each cause and tendency are prepared in the memory in the controller of the wire electric discharge machining apparatus and, after selective condition a is attempted, when the retry still continues, the condition is switched to selective condition b or c, and the selective condition b or c is attempted. Hereinbelow, a description is given of countermeasures against respective retry occurrence causes (see FIG. 5).

<Retry Occurrence Cause 1-A1, A2>

Annealing torque and cutting start torque parameters are lowered to optimum values.→selective conditions 1a, 1b <Retry Occurrence Cause 1-A1, A2>

In addition to the optimization of the selective conditions a and b, time before the detection of the failure detection electrode is increased.→selective condition 1c <Retry Occurrence Cause 1-A3>

Cutting air, annealing torque, and cutting start torque parameters are increased to optimum values.→selective conditions 2a, 2b <Retry Occurrence Cause 1-A4, A5>
Cutting air, annealing torque, and cutting start torque parameters are lowered to optimum values.→selective conditions 3a, 3b
<Retry Occurrence Cause 2a-A6, A7>
Cutting air, annealing torque, and cutting start torque parameters are lowered to optimum values.→selective conditions 4a, 4b
<Retry Occurrence Cause 2b-A6, A7>
Cutting air, annealing torque, and cutting start torque parameters are lowered to optimum values.→selective conditions 5a, 5b
<Retry Occurrence Cause 2-A8>
Annealing torque and cutting start torque parameters are lowered to optimum values.→selective conditions 6a, 6b
<Retry Occurrence Cause 3-A9>
Annealing torque and cutting start torque parameters are lowered to optimum values.→selective condition 7a
<Retry Occurrence Cause 3-A9>
The above-mentioned optimization is performed and time before energization of the chuck part cutting electrode is increased.→selective condition 7b
<Retry Occurrence Cause 3-A10>
Annealing torque and cutting start torque parameters are lowered to optimum values.→selective conditions 8a, 8b
<Retry Occurrence Cause 4-A9>
A message indicative of the adjustment of the chuck electrode part and the replacement of the electrode is displayed on the operation screen.
<Retry Occurrence Cause 4-A10>
A message indicative of the adjustment of the automatic wire-connection unit and the detection electrode part is displayed on the operation screen.
As described above, the countermeasure corresponding to the retry occurrence cause is automatically selected.

FIG. 4 is a flowchart explaining processes for automatically selecting the cutting condition. Hereinbelow, a description is given according to each Step.

[Step SA01] Default cutting conditions are read.
[Step SA02] The cutting process is executed.
[Step SA03] The wire-connection process is executed.
[Step SA04] It is determined whether or not the wire connection is successful. When the wire connection is successful (determination: YES), the process in the automatic wire connection mode is ended and, when the wire connection is unsuccessful (determination: NO), the process proceeds to Step SA05.
[Step SA05] The cutting condition automatic selection process is executed.
[Step SA06] It is determined whether or not the selected parameter set is adopted as a new default cutting condition. When the selected parameter set is adopted as the new default cutting condition, the process proceeds to Step SA07 and, when the selected parameter set is not adopted as the new default cutting condition, the automatic wire connection mode is ended.
[Step SA07] The selected parameter set is stored as the new default cutting cutting condition and the automatic wire connection mode is ended.

An additional description is given of the processes shown in the flowchart described above.

The process in Step SA04 is the wire-connection process performed when the wire electrode line 8 is broken, and includes the wire-connection process only by taking up and rewinding the tip portion of the wire electrode line 8, and the wire-connection process by cutting the tip portion of the wire electrode line 8 and taking up and rewinding the tip potion obtained by the cutting. This process is a process performed in the automatic wire connection process of the wire electric discharge machining apparatus.

In the process in Step SA05, as shown in FIG. 5, the selective conditions "a", "b", and "c" suitable for the individual causes and tendencies are prepared as the countermeasures against the retry of the wire electrode line 8 and, after "a" is attempted, when the retry continues, the selective condition is switched to "b" or "c", and "b" or "c" is attempted. Note that, for some causes and tendencies, the selective conditions "a", "b", and "c" are prepared in three hierarchies. The selective conditions 1a to 8a, the selective conditions 1b to 8b, and the selective condition 1c that are shown in FIG. 5 are stored in association with the wire electrode line wire-connection failure sections in the memory of the wire electric discharge machining apparatus as parameter sets as combinations of a plurality of parameters.

In the execution of the cutting condition automatic selection process in Step SA05, the cutting state and the cause peculiar to the position are determined from the retry frequent occurrence section (retry frequent occurrence position), the retry frequent occurrence position is divided into A1-A5, A6-A8, and A9-A10, the parameter set for performing the automatic wire connection is switched by selecting the selective condition for eliminating the retry occurrence cause, and the retry is executed. When the wire connection is successful by switching the parameter set, the parameter set obtained by the switching may be adopted as the new default condition of the automatic wire connection.

In the case where the wire connection is unsuccessful even when the selective condition is changed the predetermined number of times, a predetermined warning display such as <Retry Occurrence Cause 4-A9>, the message indicative of the adjustment of the chuck part electrode and the replacement of the electrode, or <Retry Occurrence Cause 4-A10>, the message indicative of the adjustment of the automatic wire-connection unit and the detection part electrode, may be displayed on the display device provided in the controller that controls the wire electric discharge machining apparatus.

What is claimed is:
1. A wire electric discharge machining apparatus having a function of automatically selecting an automatic wire-connection parameter, comprising:
an execution part that executes automatic wire connection according to a plurality of parameters determining a condition for performing the automatic wire connection;
a wire electrode line wire-connection failure section detection part that detects a wire-connection failure section in a running path of a wire electrode when wire connection by the automatic wire connection by the execution section is unsuccessful;
a count/storage part that counts and stores the number of failures of the wire connection in the wire electrode line wire-connection failure section;
a parameter set storage part that stores a parameter set as a combination of the plurality of parameters in association with the wire electrode line wire-connection failure section; and
a parameter set switching part that selects and adopts, based on a count value stored in the count/storage part, the parameter set as a default condition for performing an automatic wire connecting operation from among the parameter sets each associated with the wire electrode line wire-connection failure section and stored in the parameter set storage part when the wire connection is unsuccessful even in a preset wire connecting operation.

2. The wire electric discharge machining apparatus having a function of automatically selecting an automatic wire-connection parameter according to claim 1, further comprising:
- a message storage part that stores a message for warning an operator in association with the wire electrode line wire-connection failure section; and
- a display part that displays, when the wire connection is unsuccessful in the wire electrode line wire-connection failure section after the parameter set is selected and adopted in the parameter set switching part, the message associated with the wire electrode line wire-connection failure section stored in the message storage part.

* * * * *